(12) United States Patent
Ross

(10) Patent No.: US 12,178,201 B1
(45) Date of Patent: Dec. 31, 2024

(54) FISHING ROD HOLDING ASSEMBLY

(71) Applicant: Bryan Scott Ross, Gibraltar, MI (US)

(72) Inventor: Bryan Scott Ross, Gibraltar, MI (US)

( * ) Notice: Subject to any disclaimer, the term of this patent is extended or adjusted under 35 U.S.C. 154(b) by 0 days.

(21) Appl. No.: 18/673,631

(22) Filed: May 24, 2024

(51) Int. Cl.
*A01K 97/10* (2006.01)
*B63B 17/00* (2006.01)

(52) U.S. Cl.
CPC .............. *A01K 97/10* (2013.01); *B63B 17/00* (2013.01); *B63B 2017/0054* (2013.01)

(58) Field of Classification Search
CPC ................ A01K 97/10; Y10S 224/922; B63B 2017/0054
See application file for complete search history.

(56) References Cited

U.S. PATENT DOCUMENTS

| | | | | | |
|---|---|---|---|---|---|
| 3,058,250 | A * | 10/1962 | Thomas | ................. | A01K 97/10 43/17 |
| 3,628,275 | A * | 12/1971 | Howard | ................. | A01K 97/10 43/17 |
| 3,749,294 | A * | 7/1973 | Johnston | ................ | A01K 97/10 224/907 |
| 4,112,607 | A * | 9/1978 | Scher | ..................... | A01K 97/10 43/17 |
| 4,334,377 | A * | 6/1982 | Hartwig | ................. | A01K 97/10 43/16 |
| 4,731,947 | A * | 3/1988 | Hart | ....................... | A01K 97/10 248/514 |
| 5,903,998 | A * | 5/1999 | Hawkins | ................ | A01K 97/11 43/15 |
| 7,434,348 | B1 * | 10/2008 | Welch | .................... | A01K 97/10 43/17 |
| 7,559,171 | B2 * | 7/2009 | Bateman | ................ | A01K 97/10 248/533 |
| 2024/0147980 | A1 * | 5/2024 | Morse | .................... | A01K 97/11 |

* cited by examiner

*Primary Examiner* — Bradley Duckworth
(74) *Attorney, Agent, or Firm* — Carlson, Gaskey & Olds, P.C.

(57) ABSTRACT

A fishing rod holding assembly has a movable rod holder with a rod holding tube, a movable plate assembly, and a first spring holding bracket. The rod holding tube is coupled to the movable plate assembly, and the first spring holding bracket is coupled to the movable plate assembly. The fishing rod holding assembly includes a stationary mounting assembly having a second spring holding bracket. The stationary mounting assembly has a channel for slidably receiving a portion of the movable plate assembly of the movable rod holder therein. The fishing rod holding assembly includes a first spring that is coupled to the first spring holding bracket of the movable rod holder and the second spring holding bracket of the stationary mounting assembly.

14 Claims, 16 Drawing Sheets

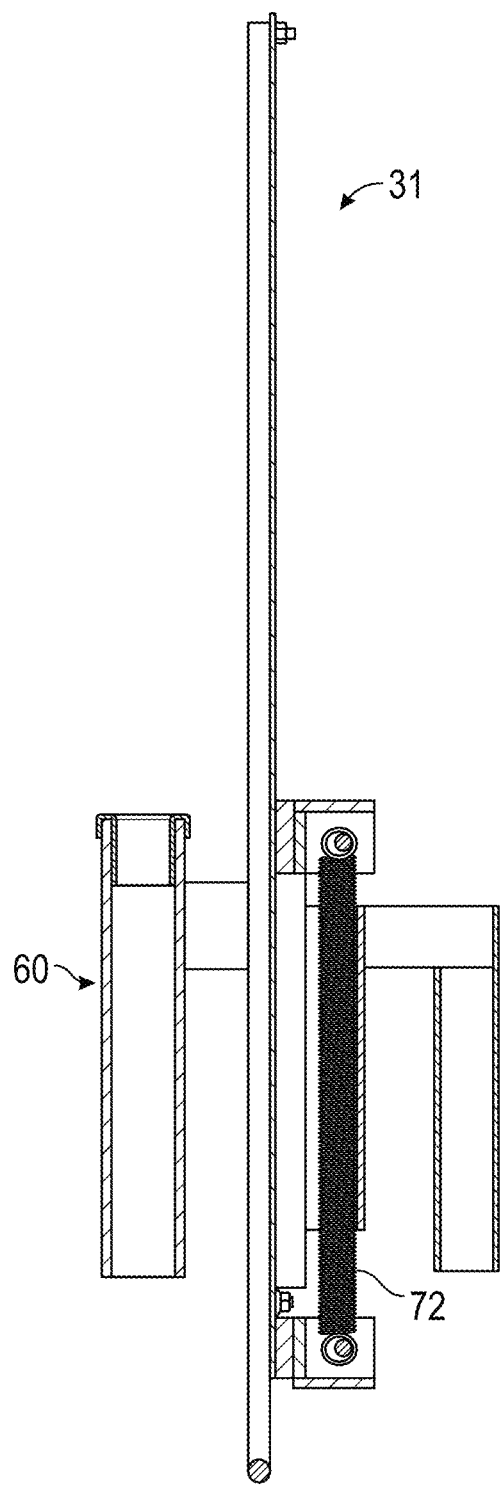
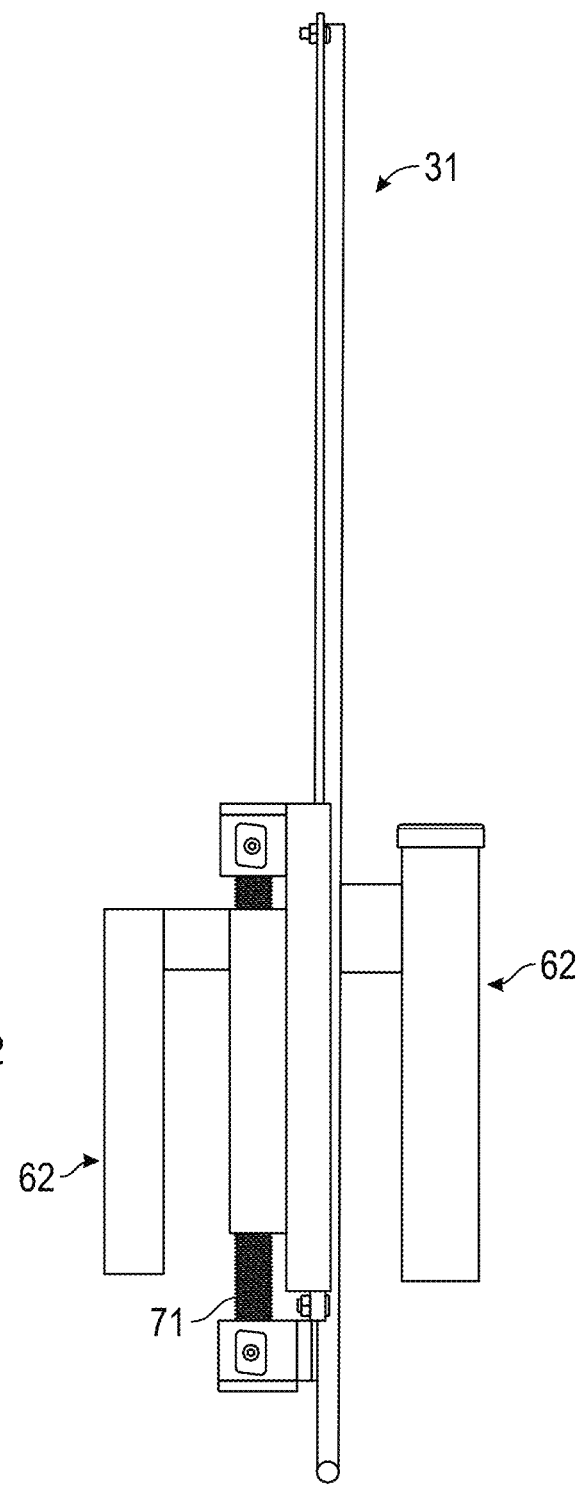
FIG. 7       FIG. 8

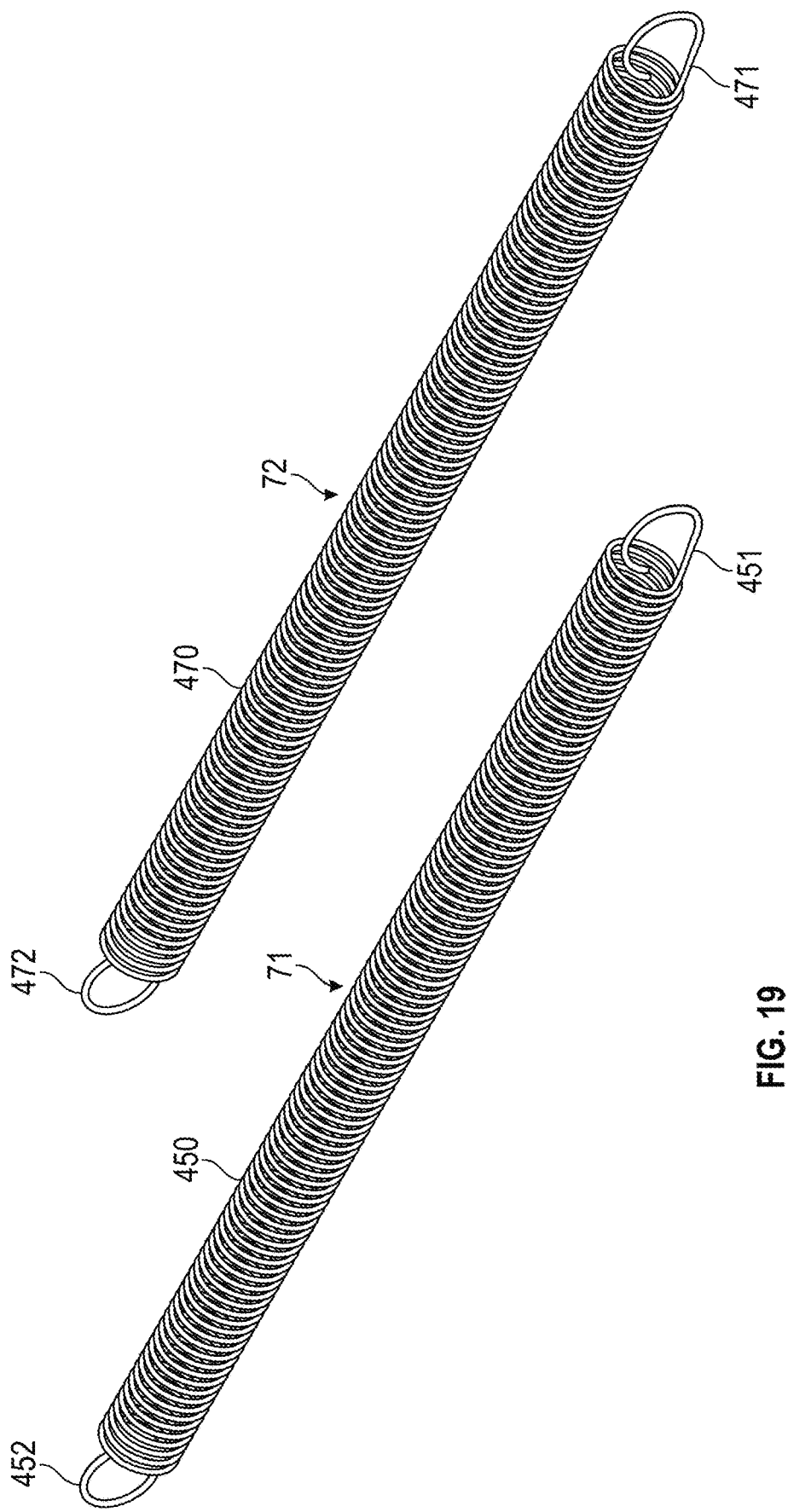

FISHING ROD HOLDING ASSEMBLY

BACKGROUND

A fishing boat with an arch rod holder typically requires a person to stand on a rail or a side of the boat to install or remove a fishing rod from the arch rod holder because the arch rod holder is mounted relatively high on the boat. Also, if the fishing boat is in rough waves, it is relatively dangerous for a person to stand on the rail or the side of the boat to install or remove the fishing rod from the arch rod holder.

The inventor herein has recognized a need for an improved fishing rod holding assembly that minimizes and/or reduces the above-mentioned problem.

SUMMARY

A fishing rod holding assembly in accordance with an exemplary embodiment is provided. The fishing rod holding assembly includes a movable rod holder having a rod holding tube, a movable plate assembly, and a first spring holding bracket. The rod holding tube is coupled to the movable plate assembly. The first spring holding bracket is coupled to the movable plate assembly opposite to the rod holding tube. The fishing rod holding assembly further includes a stationary mounting assembly having a second spring holding bracket. The stationary mounting assembly has a channel for slidably receiving a portion of the movable plate assembly of the movable rod holder therein. The fishing rod holding assembly further includes a first spring that is coupled to the first spring holding bracket of the movable rod holder and the second spring holding bracket of the stationary mounting assembly such the movable rod holder is movable downwardly relative to the stationary mounting assembly when a downward force is applied to the movable rod holder that is greater than a tension force of the first spring.

BRIEF DESCRIPTION OF THE DRAWINGS

FIG. 7 is a cross-sectional view of the first fishing rod holding assembly of FIG. 6 taken along lines 7-7 in FIG. 6;

FIG. 8 is a second side view of the first fishing rod holding assembly of FIG. 2;

FIG. 19 is an isometric view of a first spring utilized in the first fishing rod holding assembly of FIG. 2;

FIG. 20 is an isometric view of a second spring utilized in the first fishing rod holding assembly of FIG. 2;

DETAILED DESCRIPTION

Figure 1:
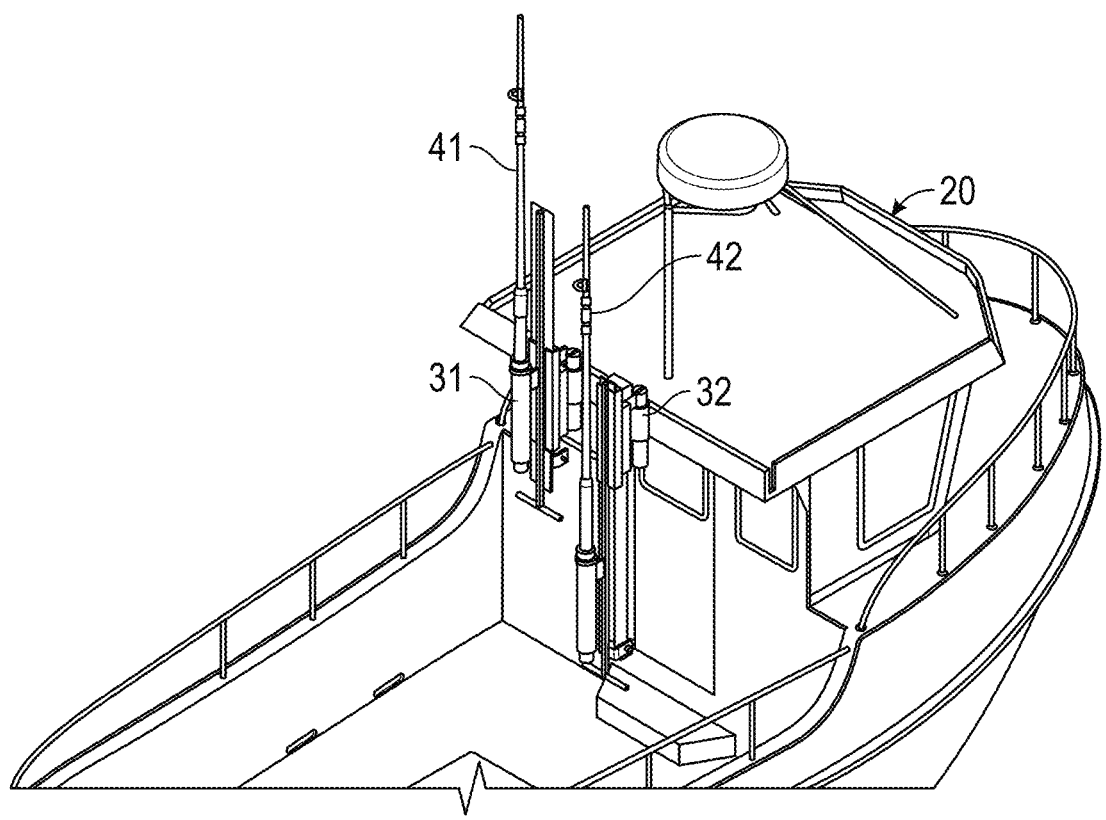
FIG. 1 is a schematic of a fishing boat having first and second fishing rod holding assemblies in accordance with an exemplary embodiment, and first and second fishing rods therein.

Referring to FIG. 1, a fishing boat 20 having fishing rod holding assemblies 31, 32 in accordance with an exemplary embodiment are illustrated. The fishing rod holding assemblies 31, 32 are removably mounted in the mounting tubes 51, 52 respectively which are coupled to the fishing boat 20. The fishing rod holding assemblies 31, 32 hold the fishing rods 41, 42 respectively in an upright position. Since the structure of the fishing rod holding assemblies 31, 32 are identical to one another, only the structure of the fishing rod holding assembly 31 will be discussed in greater detail below.

Referring to FIGS. 2-17, the fishing rod holding assembly 31 is provided to hold the fishing rod 41 therein and to allow a user to move the fishing rod 41 downwardly for removal of the rod 41 from the assembly 31. The fishing rod holding assembly 31 includes a movable rod holder 60, a stationary mounting assembly 62, a first spring 71 (shown in FIG. 13), and a second spring 72. An advantage of the fishing rod holding assembly 31 is that a user can move the movable rod holder 60 downwardly relative to the stationary mounting assembly 62 when a downward force is applied to the movable rod holder 60 that is greater than the combined tension forces of the first and second springs 71, 72. As a result, the user can easily install or remove the fishing rod 41 in the movable rod holder 60 when the movable rod holder 60 is below the stationary mounting assembly 62.

Movable Rod Holder

Figure 2:
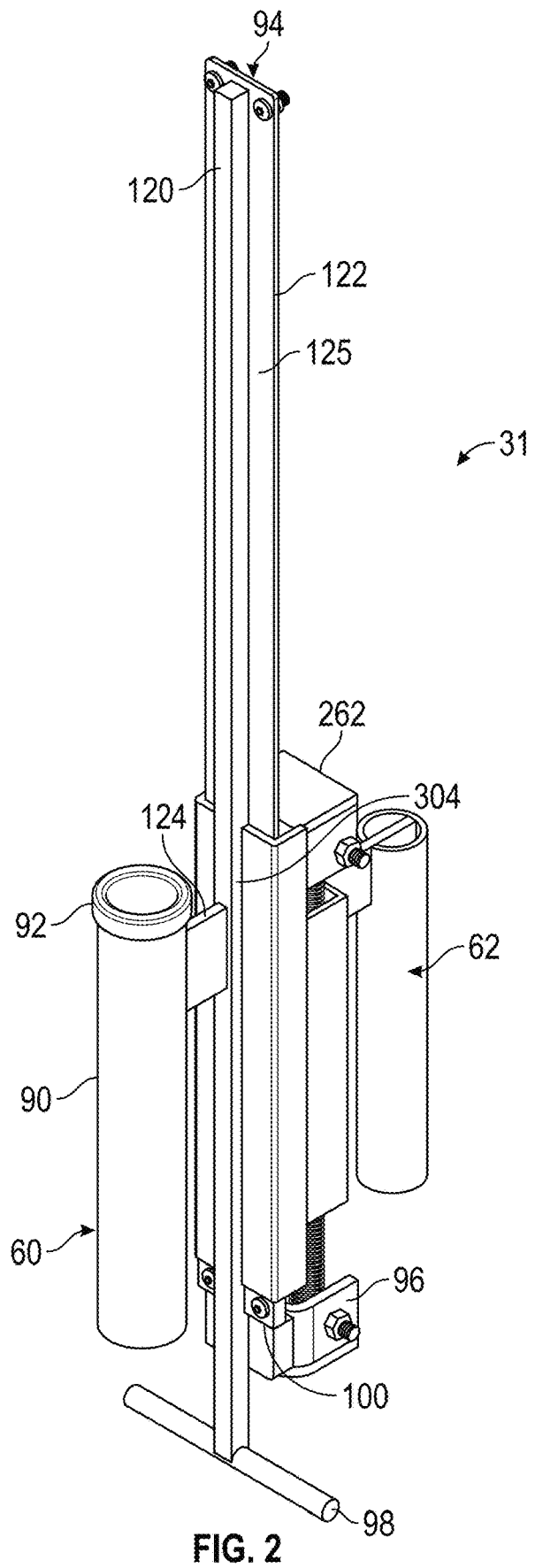
FIG. 2 is an isometric view of the first fishing rod holding assembly of FIG. 1.
Figure 3:
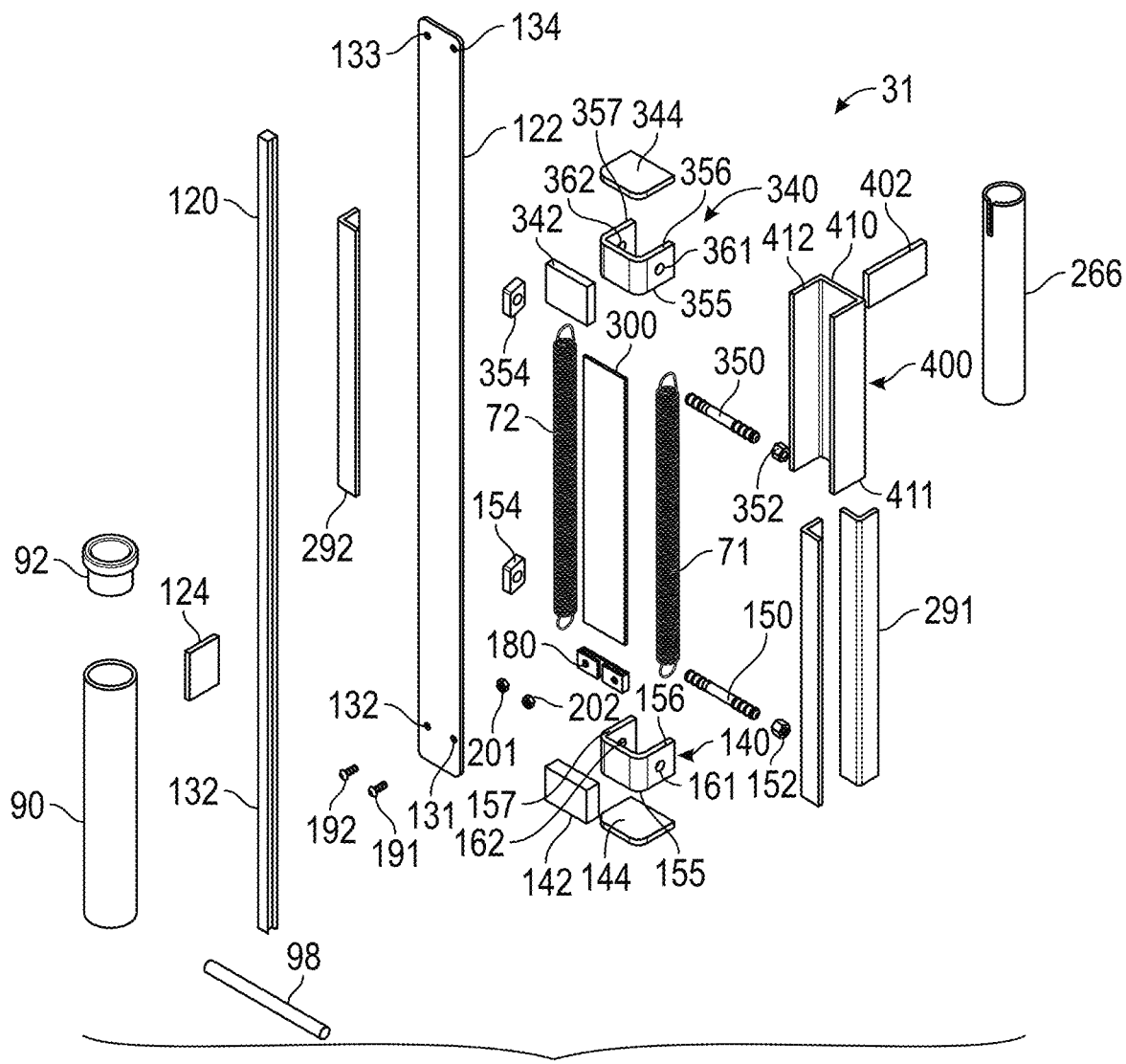
FIG. 3 is an exploded view of the first fishing rod holding assembly of FIG. 2.

Referring to FIGS. 1-3, the movable rod holder 60 is provided to hold the fishing rod 41 therein and to be movable relative to the stationary mounting assembly 62. The movable rod holder 60 includes a rod holding tube 90, a tubular cap member 92, a movable plate assembly 94, a spring holding bracket 96, a handle portion 98, and a bumper assembly 100.

Rod Holding Tube

Referring to FIGS. 1-4, the rod holding tube 92 is coupled to the movable plate assembly 94 utilizing the intermediate coupling plate 124. The tubular cap member 92 is coupled to a top portion of the rod holding tube 92. The rod holding tube 92 has a diameter of sufficient size to receive a portion of the fishing rod 41 therein. In an exemplary embodiment, the rod holding tube 92 is constructed of a metal such as steel. Further, the tubular cap member 92 is constructed of plastic.

Movable Plate Assembly

Figure 10:
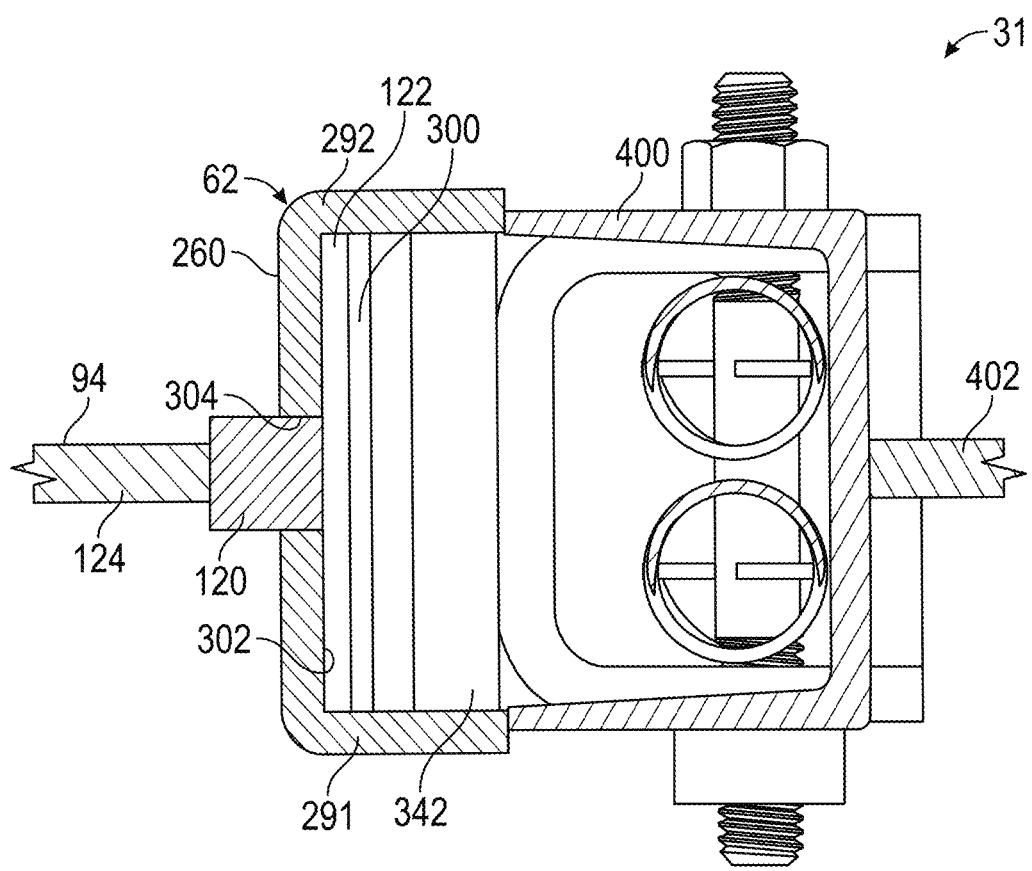
FIG. 10 is a first fishing rod holding assembly of FIG. 6 taken along lines 10-10 in FIG. 6.
Figure 11:
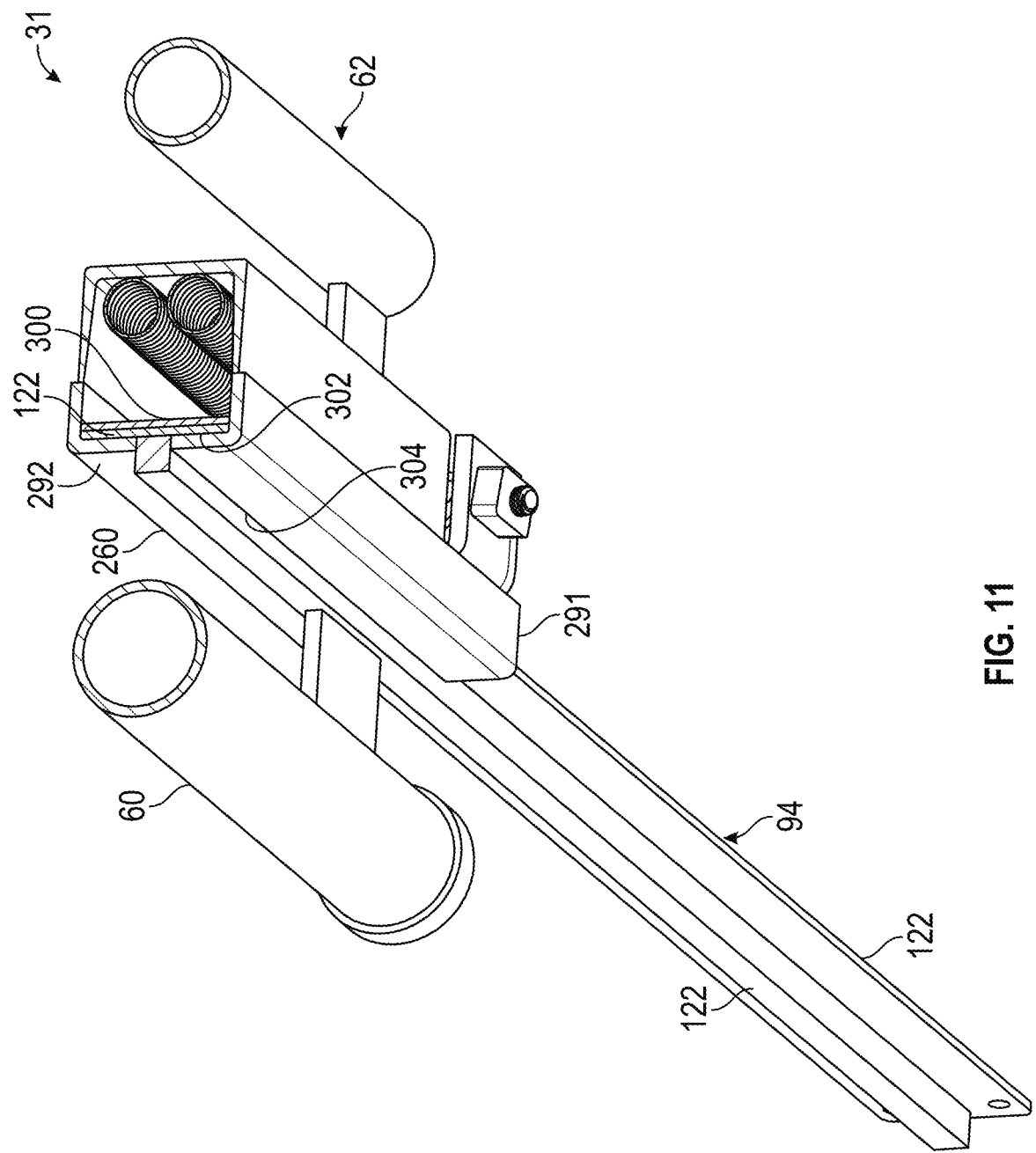
FIG. 11 is a cross-sectional view of the first fishing rod holding assembly of FIG. 6 taken along lines 11-11 in FIG. 6.

Referring to FIGS. 2, 3 and 10, the movable plate assembly 94 is coupled to the rod holding tube 90. The movable plate assembly 94 is slidably received within a channel 302 of the stationary mounting assembly 62 for adjusting a vertical height of the rod holding tube 90. The movable plate assembly 94 includes an elongated rod member 120, an elongated backing plate 122, and the intermediate coupling plate 124. In an exemplary embodiment, the elongated rod member 120, the elongated backing plate 122, and the intermediate coupling plate 124 are each constructed of a metal such as steel.

Figure 4:
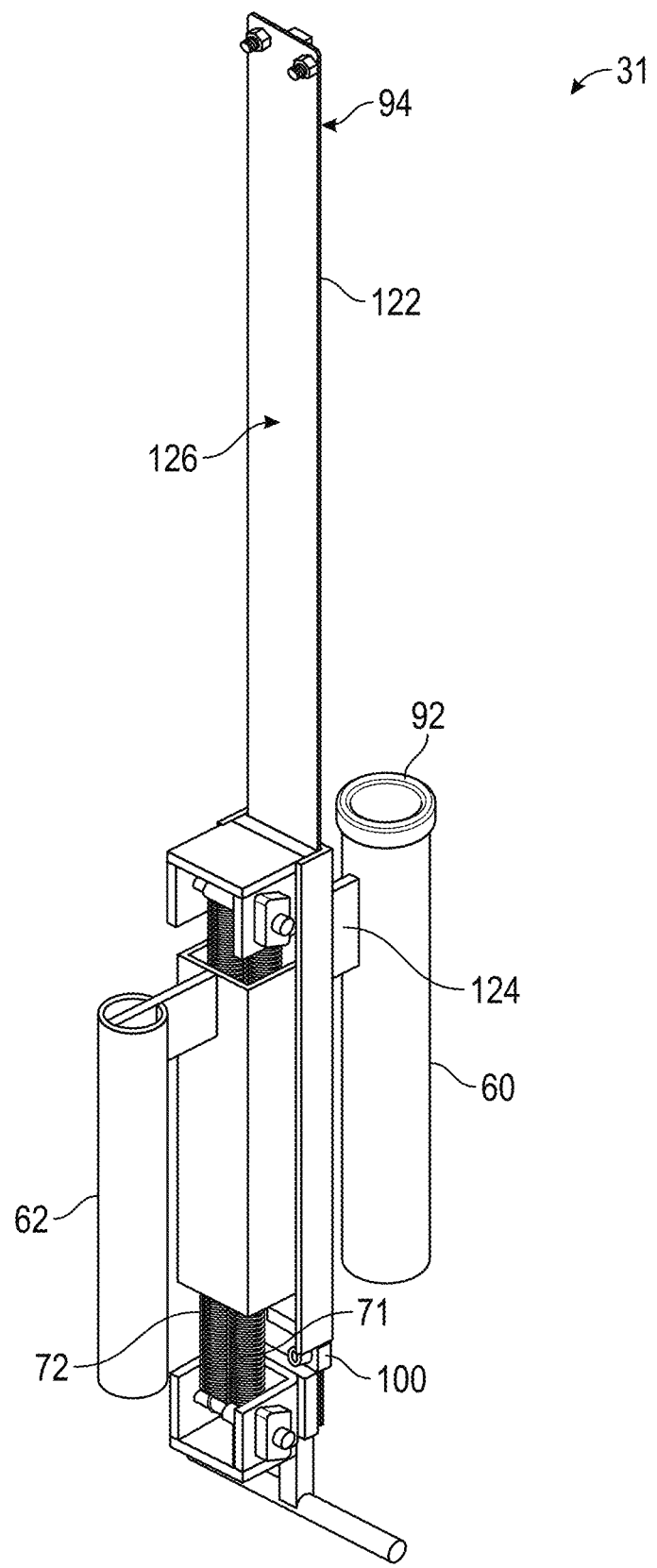
FIG. 4 is another isometric view of the first fishing rod holding assembly of FIG. 2 having a first operational position.

Referring to FIGS. 2-4 and 10, the elongated backing plate 122 includes a front surface 125 (shown in FIG. 2) and a rear surface 126 (shown in FIG. 4). Further, the elongated backing plate 122 includes apertures 131, 132 extending through a lower portion of the plate 122, and apertures 133, 134 extending through an upper portion of the plate 122. The elongated backing plate 122 is slidably received within a channel 302 (shown in FIG. 10) of the stationary mounting assembly 62.

The elongated rod member 120 is coupled to the front surface 125 of the elongated backing plate 122. The elongated rod member 120 is slidably received within a gap 304 (shown in FIG. 10) of the stationary mounting assembly 62. A longitudinal length of the elongated rod member 120 is greater than a longitudinal length of the elongated backing plate 122 such that the elongated rod member 120 extends past a lower end of the elongated backing plate 122.

Referring to FIGS. 2 and 10, the intermediate coupling plate 124 is coupled to and between the rod holding tube 90 and the elongated rod member 120.

Spring Holding Bracket

Figure 12:
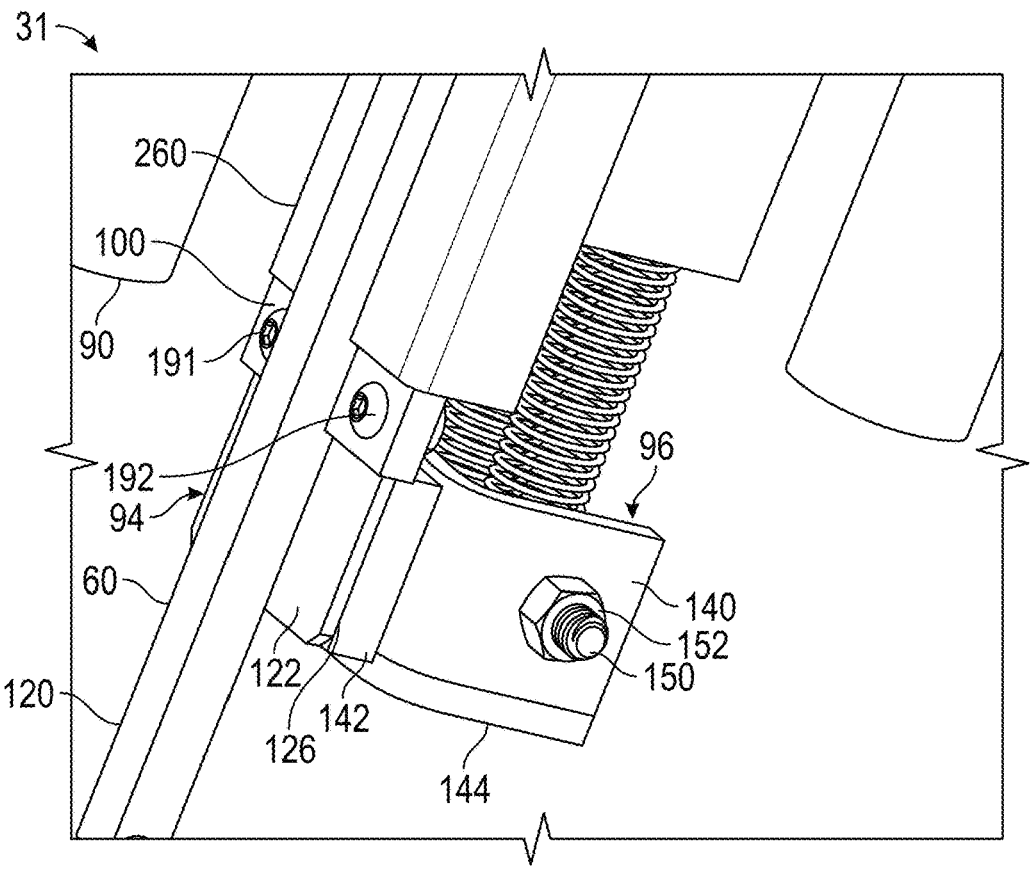
FIG. 12 is an enlarged isometric view of a lower portion of the first fishing rod holding assembly of FIG. 8.
Figure 13:
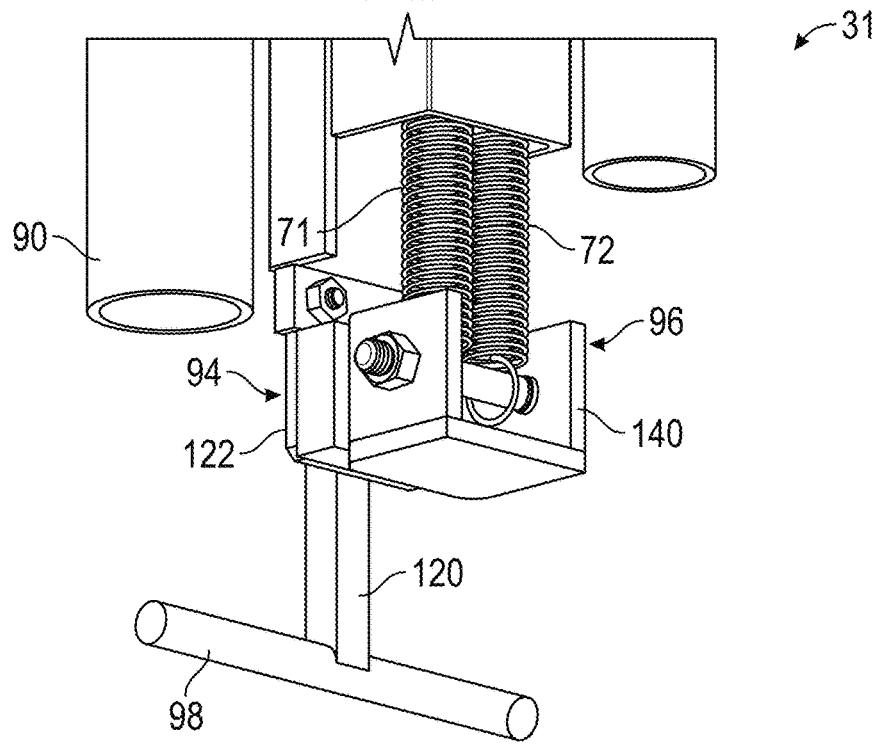
FIG. 13 is another enlarged isometric view of a lower portion of the first fishing rod holding assembly of FIG. 8.
Figure 14:
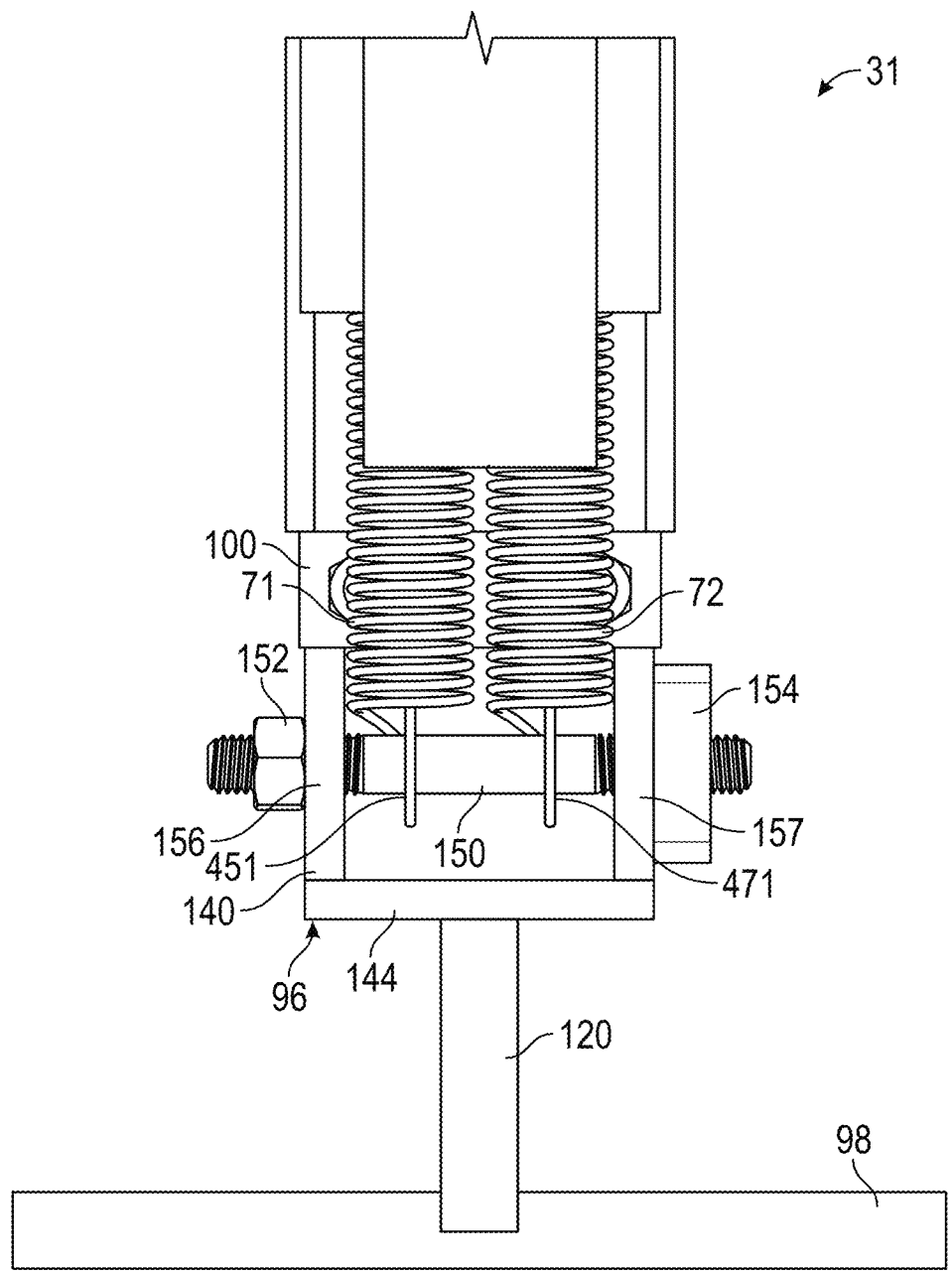
FIG. 14 is an enlarged rear view of a lower portion of the first fishing rod holding assembly of FIG. 8.
Figure 15:
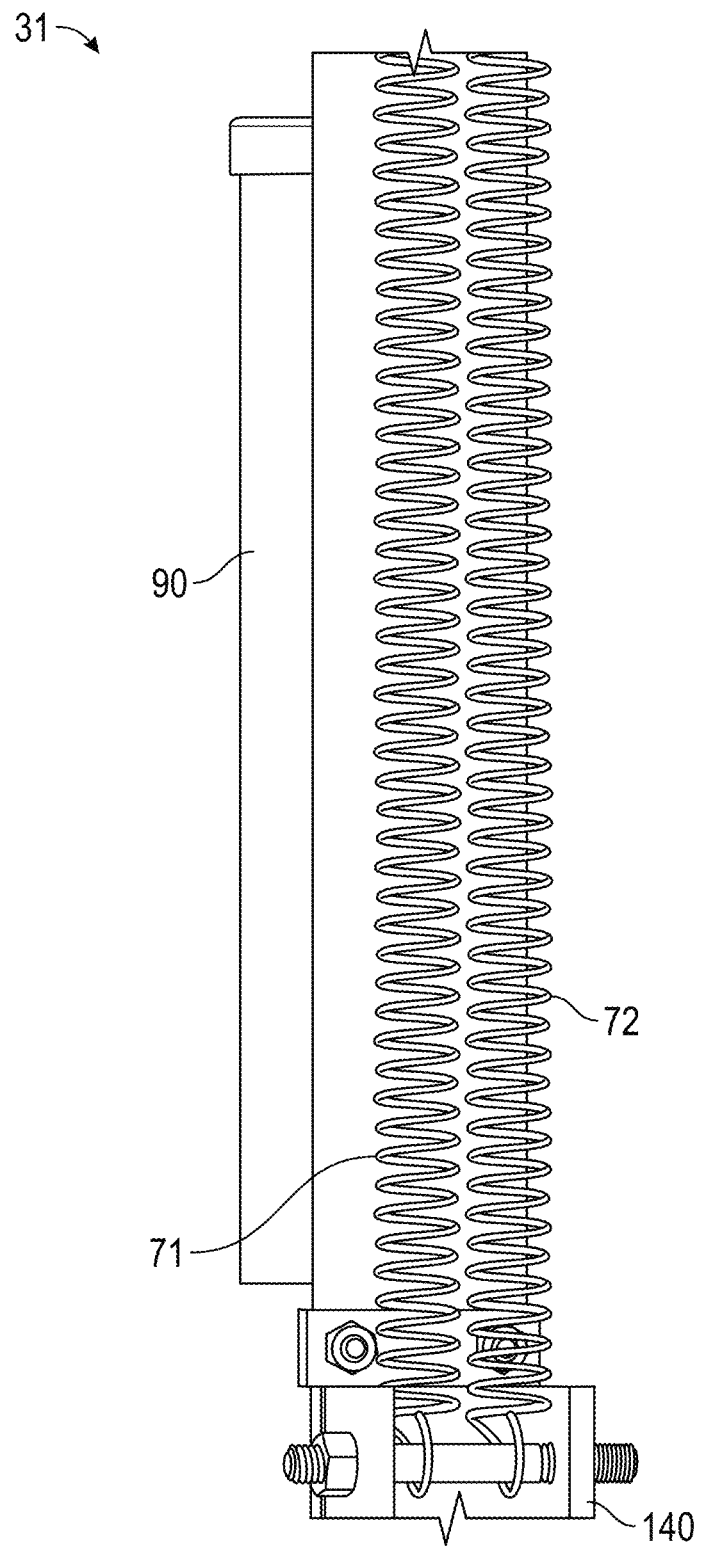
FIG. 15 is an enlarged view of a portion of the components in a central portion of the first fishing rod holding assembly of FIG. 8.

Referring to FIGS. 3 and 12-15, the spring holding bracket 96 is coupled to a bottom portion of the rear surface 126 (shown in FIG. 4) of the elongated backing plate 122 opposite to the elongated rod member 120. Further, the spring holding bracket 96 is coupled to the movable plate assembly 94 opposite to the rod holding tube 90. Referring to FIG. 14, the spring holding bracket 96 is provided to hold a hook portion 451 of the first spring 71 thereon and a hook portion 471 of the second spring 72 thereon. The spring holding bracket 96 includes a U-shaped bracket 140, an attachment plate 142, a bottom plate 144, a bolt 150, a nut 152, and a nut 154. In an exemplary embodiment, the U-shaped bracket 140, the attachment plate 142, the bottom plate 144, the bolt 150, the nut 152, and the nut 154 are each constructed of a metal such as steel.

Attachment Plate

Referring to FIGS. 3 and 12, the attachment plate 142 is coupled to a rear surface 126 (shown in FIG. 4) of the elongated backing plate 122 at a bottom portion of the plate 122.

U-Shaped Bracket

The U-shaped bracket 140 is coupled to the attachment plate 142 opposite to the elongated backing plate 122. The U-shaped bracket 140 includes a wall portion 155 and arm portions 156, 157 extending perpendicular to the wall portion 155. The arm portions 156, 157 have first and second holes 161, 162 respectively extending therethrough.

Bottom Plate

The bottom plate 144 is coupled to a bottom surface of the U-shaped bracket 140.

Bolt

Referring to FIGS. 3 and 14, the bolt 150 extends through the first and second holes 161, 162 in the arm portions 156, 157 respectively of the U-shaped bracket 140. The bolt 150 is further coupled to the nuts 152, 154 that are disposed adjacent to the arm portions 156, 157 respectively. The bolt 150 holds the hook portion 451 of the first spring 71 thereon and the hook portion 471 of the second spring 72 thereon.

Handle Portion

Referring to FIG. 14, the handle portion 98 is coupled to an end of the elongated rod member 120 below the spring holding bracket 96. In an exemplary embodiment, the handle portion 98 is constructed of a metal such as steel.

Bumper Assembly

Referring to FIGS. 3, 12, 21 and 22, the bumper assembly 100 is coupled to a lower end portion of the elongated backing plate 122 above the spring holding bracket 96. The bumper assembly 100 contacts the plate holding assembly 260 of the stationary mounting assembly 62 when the movable rod holder 60 has a first operational position (shown in FIGS. 4 and 12) relative to the stationary mounting assembly 62. The bumper assembly 100 includes a bumper member 180, bolts 191, 192 and nuts 201, 202. In an exemplary embodiment, the bumper member 180, bolts 191, 192 and nuts 201, 202 are each constructed of a metal such as steel.

Bumper Member

Figure 21:
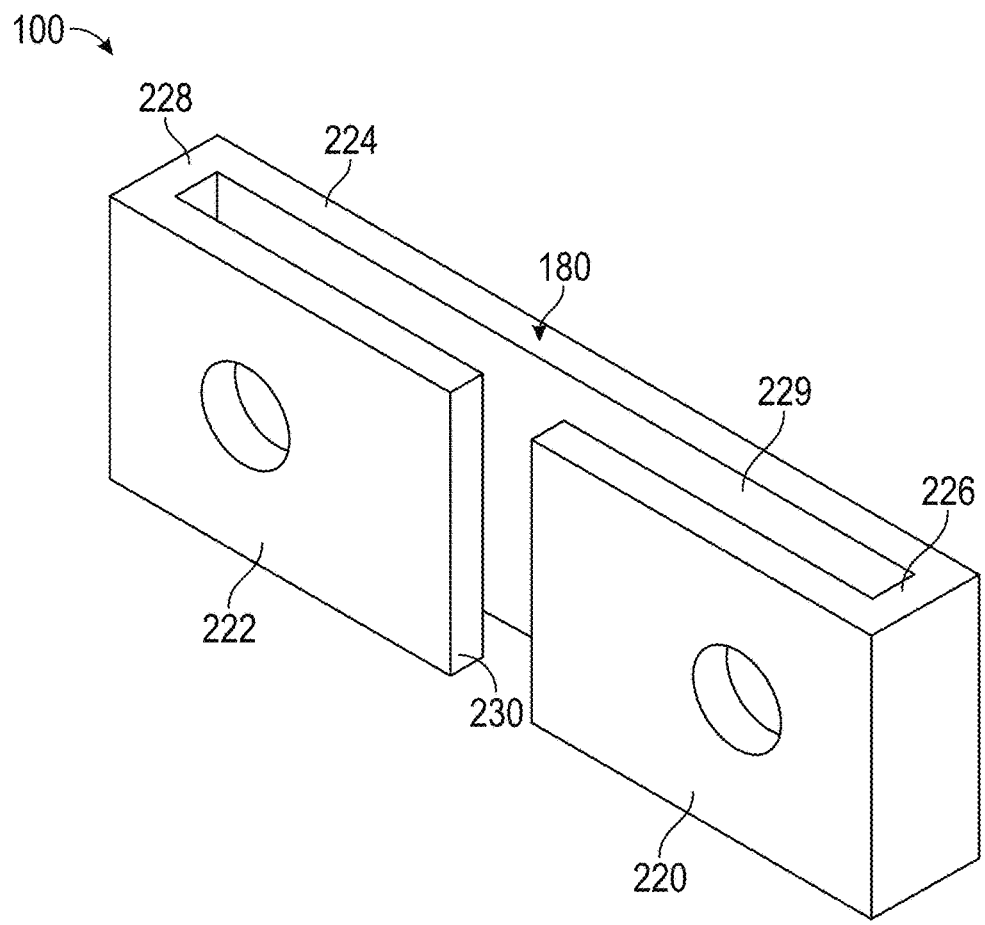
FIG. 21 is an isometric view of a bumper member utilized in the first fishing rod holding assembly of FIG. 2.

Referring to FIGS. 12, 21 and 23, the bumper member 180 includes a lateral wall 220, a lateral wall 222, a lateral wall 224, a side wall 226, and a side wall 228. The side walls 226, 228 extend outwardly and perpendicular to the lateral wall 224. The lateral walls 220, 222 extend from the side walls 226, 228 respectively toward one another. The laterals wall 220, 222, 224 and side walls 226, 228 form an interior region 229 therein that is sized and shaped to receive a portion of the elongated backing plate 122 therein. The lateral walls 220, 222 extend toward one another such that a gap 230 is formed therebetween. The gap 230 communicates with the interior region 229 and is sized and shaped to receive a portion of the elongated rod member 120 therein.

Figure 22:
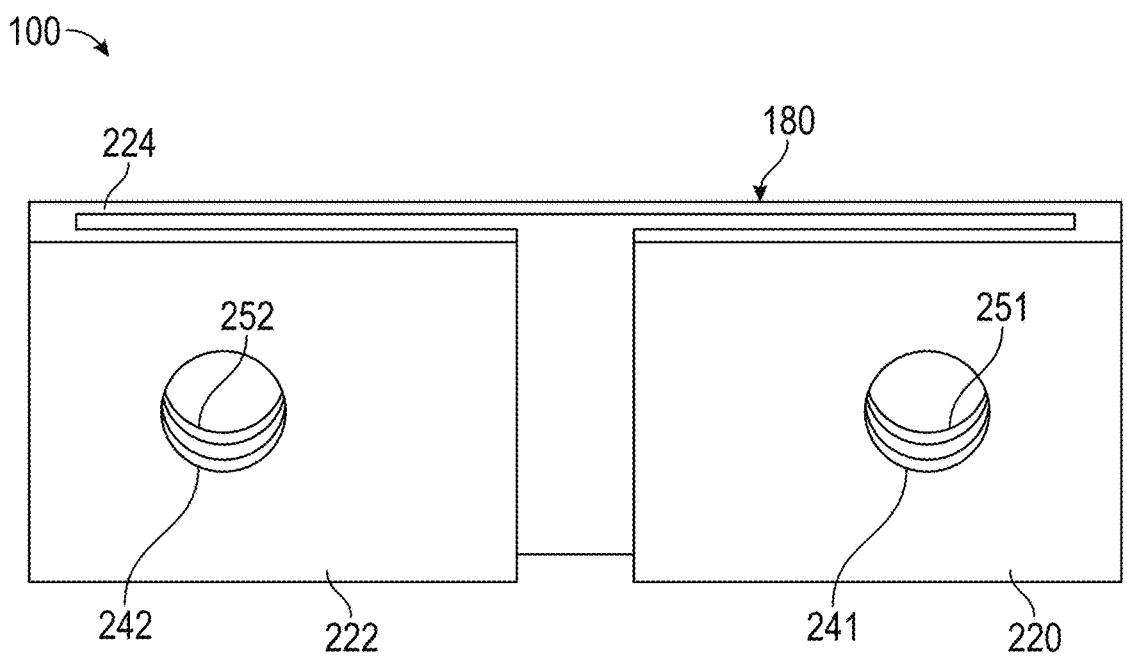
FIG. 22 is another isometric view of the bumper member of FIG. 21.

Referring to FIG. 22, the lateral wall 220 includes an aperture 241 extending therethrough, and the lateral wall 222 includes an aperture 242 extending therethrough. Further, the lateral wall 224 includes apertures 251, 252 extending therethrough that are aligned with the apertures 241, 242 respectively.

Bolts

Referring to FIGS. 3, 12 and 22, the bolt 191 extends through the aperture 241 of the bumper member 180, the aperture 131 of the elongated backing plate 122, and the aperture 251 of the bumper member 180. The bolt 191 is further coupled to a nut 201 to hold the bumper member 180 on the elongated backing plate 122. The bolt 192 extends through the aperture 242 of the bumper member 180, the aperture 132 of the elongated backing plate 122, and the aperture 252 of the bumper member 180. The bolt 192 is further coupled to a nut 202 to hold the bumper member 180 on the elongated backing plate 122.

Stationary Mounting Assembly

Referring to FIGS. 1, 3, 16 and 17, the stationary mounting assembly 62 is provided to slidably hold the movable plate assembly 94 therein. The stationary mounting assembly 62 is further removably coupled to a mounting tube 51 (shown in FIG. 1) that is coupled to the boat 20.

Figure 16:
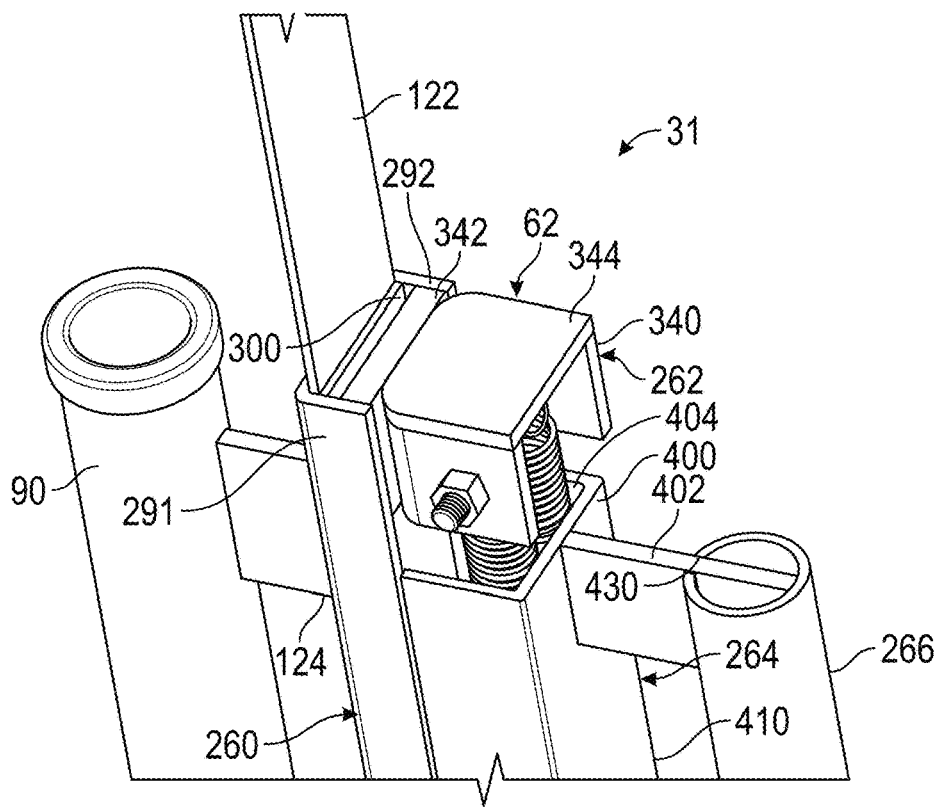
FIG. 16 is an enlarged isometric view of an upper portion of the first fishing rod holding assembly of FIG. 8.

Referring to FIG. 16, the stationary mounting assembly 62 includes a plate holding assembly 260, a spring holding bracket 262, a mounting tube coupling assembly 264, and a mounting tube 266. In an exemplary embodiment, the plate holding assembly 260, the spring holding bracket 262, the mounting tube coupling assembly 264, and the mounting tube 266 are each constructed of a metal such as steel.

Plate Holding Assembly

Referring to FIGS. 3 and 10, the plate holding assembly 260 is provided to slidably hold the elongated backing plate 122 of the movable plate assembly 94 therein. The plate holding assembly 260 include first and second L-brackets 291, 292, a guide plate 300, a channel 302, and a gap 304. In an exemplary embodiment, the first and second L-brackets 291, 292 and the guide plate 300 are each constructed of a metal such as steel.

The guide plate 300 is coupled to the first and second L-brackets 291, 292 such that the channel 302 is formed therebetween. The first and second L-brackets 291, 292 are spaced apart from one another and form a gap 304 therebetween that communicates with the channel 302. The elongated rod member 120 of the movable plate assembly 94 is slidable within the gap 304, and the elongated backing plate 122 is slidable within the channel 302.

Spring Holding Bracket

Figure 17:
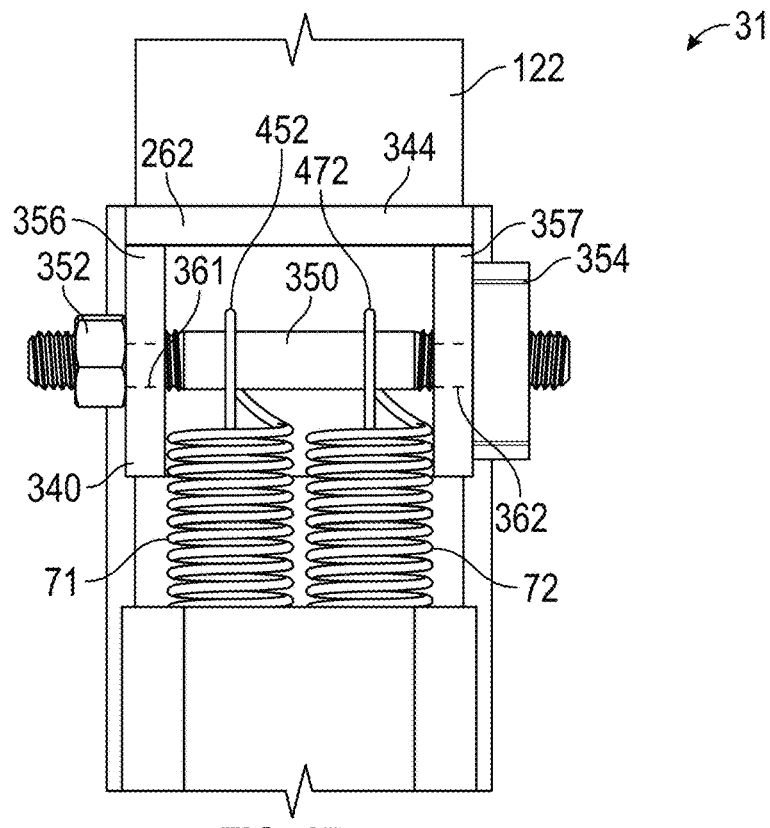
FIG. 17 is an enlarged rear view of an upper portion of the first fishing rod holding assembly of FIG. 8.
Figure 18:
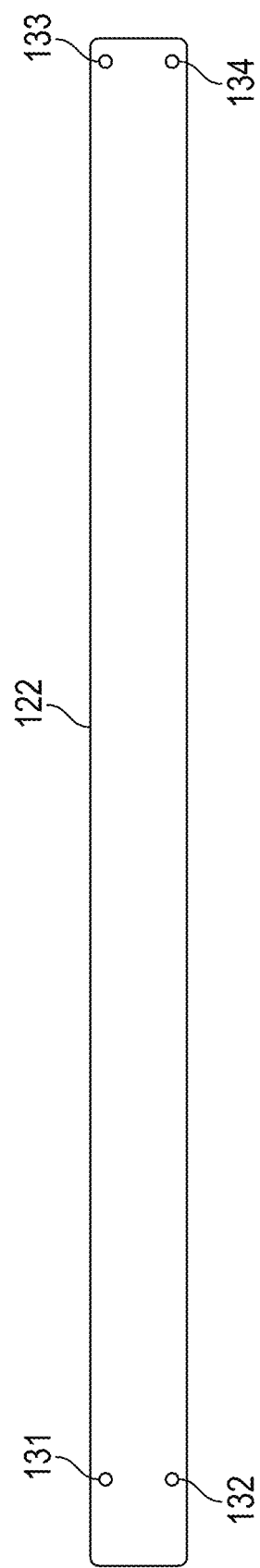
FIG. 18 is a front view of an elongated backing plate utilized in the first fishing rod holding assembly of FIG. 2.

Referring to FIGS. 3, 16 and 17, the spring holding bracket 262 is coupled to a the attachment plate 342. The attachment plate 342 is further coupled to the first and second L-brackets 291, 292 of the plate holding assembly 260.

Referring to FIGS. 3 and 17, the spring holding bracket 262 is provided to hold a hook portion 452 of the first spring 71 thereon and a hook portion 472 of the second spring 72 thereon. The spring holding bracket 262 includes a U-shaped bracket 340, an attachment plate 342, a top plate 344, a bolt 350, a nut 352, and a nut 354. In an exemplary embodiment, the U-shaped bracket 340, the attachment plate 342, the top plate 344, the bolt 350, the nut 352, and the nut 354 are each constructed of a metal such as steel.

Attachment Plate

Referring to FIG. 16, the attachment plate 342 is coupled to the first and second L-brackets 291, 292 of the plate holding assembly 260 at upper portions of the first and second L-brackets 291, 292. Further, the attachment plate 342 is spaced away from the guide plate 300 and extends parallel to the guide plate 300.

U-Shaped Bracket

Referring to FIGS. 3, 16 and 17, the U-shaped bracket 340 is coupled to the attachment plate 342. The U-shaped bracket 340 includes a wall portion 355 and arm portions 356, 357 extending perpendicular to the wall portion 355. The arm portions 356, 357 have first and second holes 361, 362 respectively extending therethrough.

Top Plate

Referring to FIGS. 16 and 17, the top plate 344 is coupled to a top surface of the U-shaped bracket 340.

Bolt

Referring to FIG. 17, the bolt 350 extends through the first and second holes 361, 362 in the arm portions 356, 357 respectively. The bolt 350 is further coupled to the nuts 352, 354 that are disposed adjacent to the arm portions 356, 357 respectively. The bolt 350 holds the hook portion 452 of the first spring 71 thereon and the hook portion 472 of the second spring 72 thereon.

Mounting Tube Coupling Assembly

Referring to FIGS. 3 and 16, the mounting tube coupling assembly 264 is provided to couple the mounting tube 266 to the plate holding assembly 260. The mounting tube coupling assembly 264 has a U-shaped plate 400 and an intermediate coupling plate 402.

U-Shaped Plate

The U-shaped plate 400 has a wall portion 410 and arm portions 411, 412 extending perpendicular to the wall portion 410. The arm portions 411, 412 are coupled to the first and second L-brackets 291, 292 respectively.

Intermediate Coupling Plate

The intermediate coupling plate 402 is coupled to and between the wall portion 410 of the U-shaped plate 400 and the mounting tube 266.

Mounting Tube

The mounting tube 266 is coupled to the intermediate coupling plate 402 and extends parallel to the rod holding tube 90. The mounting tube 266 has a slot 430 extending therethrough that receives a portion of the intermediate coupling plate 402 therein.

First Spring

Referring to FIGS. 2, 14, 17 and 19, the first spring 71 is provided to bias the movable rod holder 60 toward the stationary mounting assembly 62. The first spring 71 includes a coiled spring body 450, a hook portion 451, and a hook portion 452. The hook portion 451 is coupled to a first end of the coiled spring body 450. Further, the hook portion 452 is coupled to a second end of the coiled spring body 450. The first spring 71 extends through an interior region 404 (shown in FIG. 16) defined by the mounting tube coupling assembly 264 and the plate holding assembly 260. Further, referring to FIG. 14, the hook portion 451 is coupled to the bolt 150. Referring to FIG. 17, the hook portion 452 is coupled to the bolt 350.

Second Spring

Referring to FIGS. 2, 14, 17 and 20, the second spring 72 is provided to bias the movable rod holder 60 toward the stationary mounting assembly 62. The second spring 72 includes a coiled spring body 470, a hook portion 471, and a hook portion 472. The hook portion 471 is coupled to a first end of the coiled spring body 470. Further, the hook portion 472 is coupled to a second end of the coiled spring body 470. The second spring 72 extends through an interior region 404 (shown in FIG. 16) defined by the mounting tube coupling assembly 264 and the plate holding assembly 260. Further, referring to FIG. 14, the hook portion 471 is coupled to the bolt 150. Referring to FIG. 17, the hook portion 472 is coupled to the bolt 350.

Operation

Figures 5, 6:
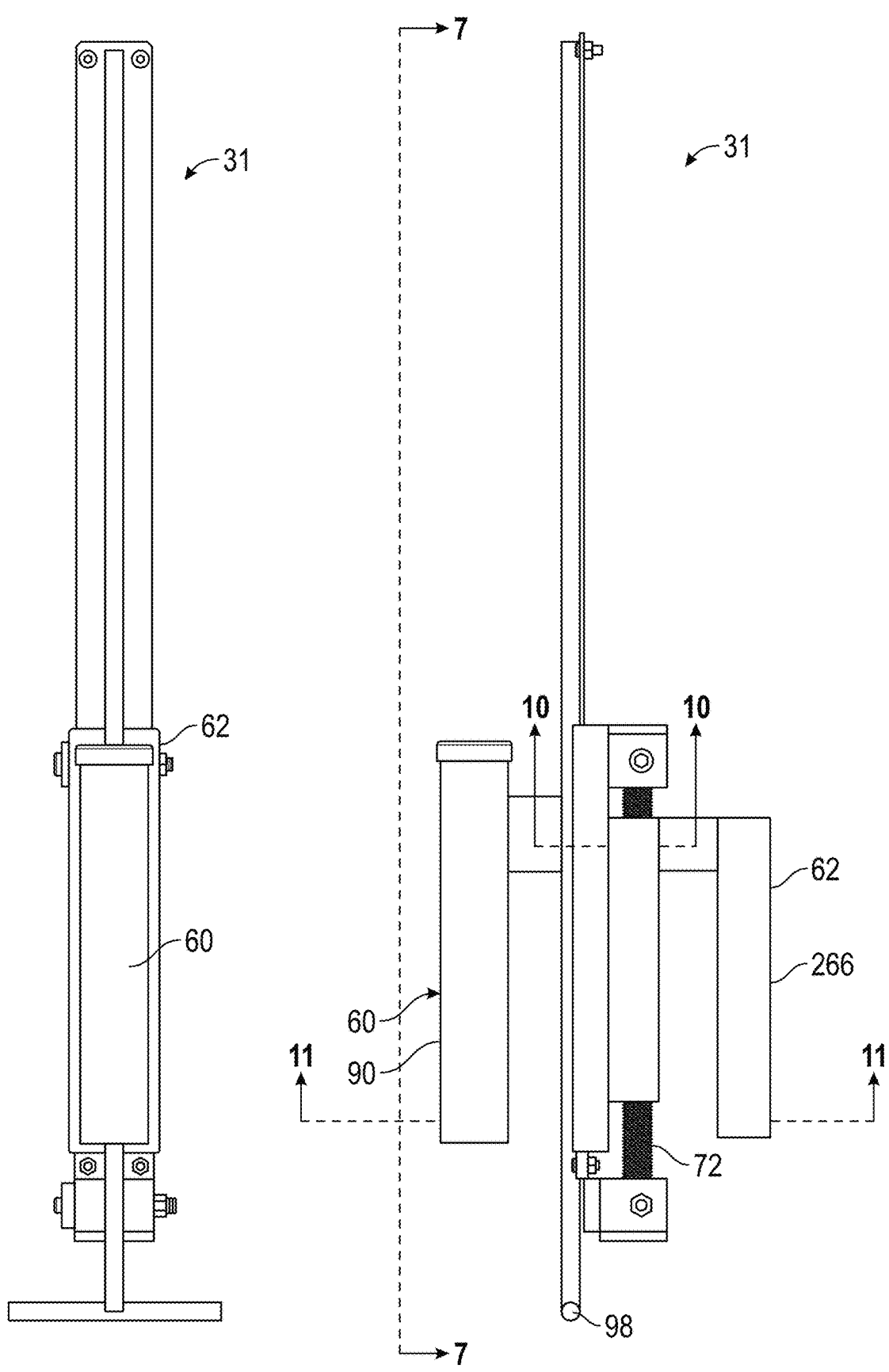
FIG. 5 is a front view of the first fishing rod holding assembly of FIG. 2.
FIG. 6 is a first side view of the first fishing rod holding assembly of FIG. 2.

Referring to FIGS. 6 and 14, the movable rod holder 60 has a first operational position relative to the stationary mounting assembly 62 such that a bottom portion of the rod holding tube 90 and a bottom portion of a mounting tube 266 are at an identical vertical height. Further, the first and second springs 71, 72 maintain the first operational position until a downward force greater than a combined tension force of the springs 71, 72 is exerted on the handle portion 98.

Figure 9:
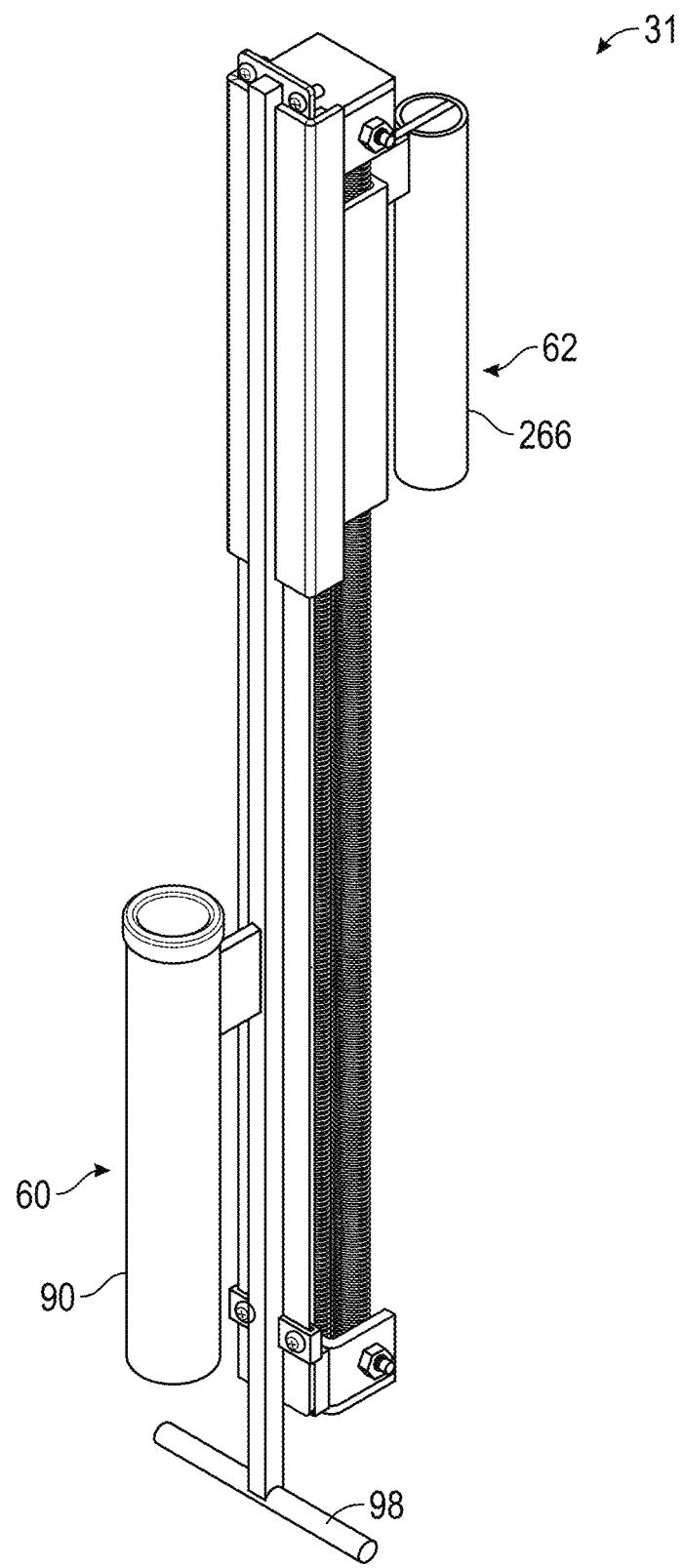
FIG. 9 is another isometric view of the first fishing rod holding assembly of FIG. 2 having a second operational position.

Referring to FIGS. 1 and 9, the movable rod holder 60 has a second operational position relative to the stationary mounting assembly 62 such that the bottom portion of the rod holding tube 90 is at a vertical height below the bottom portion of the mounting tube 266. The movable rod holder 60 has the second operational position when the user exerts a downward force greater than a combined tension force of the springs 71, 72 on the handle portion 98. In the second operational position, the user can easily install the fishing rod 41 in the movable rod holder 60 or remove the fishing rod 41 from the movable rod holder 60.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A fishing rod holding assembly, comprising:
a movable rod holder having a rod holding tube, a movable plate assembly, and a first spring holding bracket; the rod holding tube being coupled to the movable plate assembly, the first spring holding bracket being coupled to the movable plate assembly opposite to the rod holding tube;
a stationary mounting assembly having a second spring holding bracket, the stationary mounting assembly having a channel for slidably receiving a portion of the movable plate assembly of the movable rod holder therein; and
a first spring being coupled to the first spring holding bracket of the movable rod holder and the second spring holding bracket of the stationary mounting assembly such the movable rod holder is movable downwardly relative to the stationary mounting assembly when a downward force is applied to the movable rod holder that is greater than a tension force of the first spring.

2. The fishing rod holding assembly of claim 1, wherein:
the stationary mounting assembly further having a plate holding assembly, a mounting tube coupling assembly, and a mounting tube; the second spring holding bracket being coupled to the plate holding assembly, the mounting tube coupling assembly being coupled to the plate holding assembly; the mounting tube being coupled to the mounting tube coupling assembly below the second spring holding bracket; the plate holding assembly forming the channel for slidably receiving the portion of the movable plate assembly of the movable rod holder therein.

3. The fishing rod holding assembly of claim 2, wherein:
the first spring extending through an interior region defined by the mounting tube coupling assembly and the plate holding assembly.

4. The fishing rod holding assembly of claim 2, wherein:
the movable plate assembly having an elongated rod member, an elongated backing plate, and a first intermediate coupling plate; the first intermediate coupling plate being coupled to and between the rod holding tube and the elongated rod member, the elongated rod member being coupled to the elongated backing plate, the first spring holding bracket being coupled to a bottom portion of the elongated backing plate opposite to the elongated rod member.

5. The fishing rod holding assembly of claim 4, wherein:
the elongated rod member of the movable plate assembly having a longitudinal length greater than a longitudinal length of the elongated backing plate; the elongated rod member extending downwardly past the elongated backing plate; and
a handle portion being coupled to an end of the elongated rod member.

6. The fishing rod holding assembly of claim 4, further comprising:
a bumper assembly being coupled to the elongated backing plate above the first spring holding bracket, the bumper assembly contacting the plate holding assembly of the stationary mounting assembly when the movable rod holder has a first operational position relative to the stationary mounting assembly.

7. The fishing rod holding assembly of claim 4, wherein:
the plate holding assembly of the stationary mounting assembly having first and second L-brackets and a guide plate; the guide plate being coupled to the first and second L-brackets such that the channel is formed therebetween, the first and second L-brackets being spaced apart from one another and forming a gap therebetween that communicates with the channel, the elongated rod member of the movable plate assembly being slidable within the gap, and the elongated backing plate being slidable within the channel.

8. The fishing rod holding assembly of claim 7, wherein:
the mounting tube coupling assembly of the stationary mounting assembly having a U-shaped plate and a second intermediate coupling plate; the U-shaped plate being coupled to the first and second L-brackets; the second intermediate coupling plate being coupled to and between the U-shaped plate and the mounting tube; the mounting tube extending parallel to the rod holding tube.

9. The fishing rod holding assembly of claim 8, wherein:
the U-shaped plate and the first and second L-brackets and the guide plate of the plate holding assembly define an interior region for receiving the first spring therethrough.

10. The fishing rod holding assembly of claim 7, wherein:
the second spring holding bracket of the stationary mounting assembly having a U-shaped bracket, an attachment plate, and a bolt; the attachment plate being coupled to the first and second L-brackets and being spaced apart and parallel to the guide plate; the U-shaped bracket being coupled to the attachment plate, the bolt extending through first and second holes in the U-shaped bracket; the bolt being coupled to an end portion of the first spring.

11. The fishing rod holding assembly of claim 4, wherein:
the first spring holding bracket of the movable rod holder having a U-shaped bracket, an attachment plate, and a bolt; the attachment plate being coupled to the elongated backing plate; the U-shaped bracket being coupled to the attachment plate, the bolt extending through first and second holes in the U-shaped bracket; the bolt being coupled to an end portion of the first spring.

12. The fishing rod holding assembly of claim 2, wherein:
the movable rod holder has a first operational position relative to the stationary mounting assembly such that a bottom portion of the rod holding tube and a bottom portion of the mounting tube are at an identical vertical height.

13. The fishing rod holding assembly of claim 12, wherein:
the movable rod holder has a second operational position relative to the stationary mounting assembly such that the bottom portion of the rod holding tube is at a vertical height below the bottom portion of the mounting tube.

14. The fishing rod holding assembly of claim 1, further comprising:

a second spring being coupled to the first spring holding bracket of the movable rod holder and the second spring holding bracket of the stationary mounting assembly.

\* \* \* \* \*